Dec. 20, 1966 D. C. KALBFELL 3,293,607

COHERENT DECISION MAKING RECEIVER SYSTEM

Filed Oct. 20, 1961 2 Sheets-Sheet 1

INVENTOR.
DAVID C. KALBFELL
BY
George E. Pearson

INVENTOR.
DAVID C. KALBFELL
BY
George E. Pearson
ATTORNEY 3,293,607
Patented Dec. 20, 1966

3,293,607

COHERENT DECISION MAKING RECEIVER SYSTEM

David C. Kalbfell, 941 Rosecrans,
San Diego, Calif. 92106

Filed Oct. 20, 1961, Ser. No. 147,422
6 Claims. (Cl. 340—171)

This invention relates generally to the communication of digital intelligence such as binary numerical information and more particularly to a coherent decision making receiver system and method for receiving such information when it has been transmitted, at least in part, by prearrangement. A receiver system of this type is particularly useful when the signal is very weak compared to background noise and, although not restricted thereto, is thus particularly well suited for use in a drill pipe data collection system such as described in my copending application for Drill Pipe Module Data Collection and Transmission System, Serial No. 820,680, filed June 16, 1959, now Patent No. 3,015,801.

In an ordinary communication system, the bandwidth needed to identify digital information at a given rate is well known. In my receiver system, however, a much narrower effective bandwidth may be used, because much of the intelligence has been transmitted by prearrangement, or can be established over a long period of time, and the receiver system thus need function, not as a frequency identifying device, but as a decision making device in determining which of known signal frequencies is received the strongest. To this end, novel amplifier means are provided for self adjustment of the frequency of maximum gain. By this means, the receiver is adapted to follow any drift in the transmitted frequencies and only a very narrow bandwidth is required in the amplifiers. The received signal frequencies, moreover, are coherently related and, although they may drift with time, remain coherently locked together and adaptable for use at the receiver in reestablishing the intelligence and basic clock frequencies originating at the transmitter.

Another important feature of my receiver system is that noise is largely balanced out. Thus, the combination of intelligence transmittal by prearrangement, extremely narrow bandwidth, coherence between frequencies, and noise cancellation makes my system much more sensitive than earlier ones.

By way of further explanation, assume that three frequencies $f_0$, $f_1$, and $f_2$ constituting the transmitted signals of a frequency shift keying transmission system are used to indicate zeros, ones, and spaces, as described in my aforementioned copending application. Also, as set forth therein, in order to derive maximum benefit from my invention, the frequencies $f_0$, $f_1$, and $f_2$ are coherently related with their keying frequency or clock rate $f_c$. For example, at the transmitter, $f_2$ might be 50 c.p.s., and the clock $f_c$ might be 1 c.p.s. Thus, in accordance with the arrangement of my copending application, $f_0$ and $f_1$ would be produced from these frequencies through a balanced modulator and filter system as 49 c.p.s. and 51 c.p.s. It will be understood, moreover, that where, as in my copending application, for Drill Pipe Module Transmitter Transducer, Serial No. 39,633, filed June 29, 1960, now Patent No. 3,103,643, a magnetostrictive transmitter transducer is used, the received coherent frequencies will be doubled by the transducer, being thus 98, 100, and 102 c.p.s. and the clock frequency reconstructed therefrom at the receiver will be 2 c.p.s. Thus, the coherent relationship between all of the frequencies would exist even though the oscillators drifted slightly, and they may be reconstructed coherently at the receiver.

The receiver then need only decide which of three frequencies is being transmitted at any given time. It uses three identical channels, of equal bandwidth, tuned to the three frequencies with phase locked detectors. These phase locked detectors contain local oscillators which serve to follow the transmitted frequencies with a very long time constant. By heterodyning these local oscillators against one another, the clock signal is synthesized accurately in both frequency and phase. Thus, the receiver is able to establish the three intelligence frequencies and the clock frequency, in spite of slow drifts, and these determinations are made over so long a period of time that noise is irrelevant. This clock frequency is in synchronism with the frequency of the transmitter clock, and the clock at the receiver thus indicates the beginning and the end of each pulse or bit of information carried at any instant by one of the intelligence frequencies.

The receiver now knows exactly when to make the decisions between the three frequencies, since the beginning and end of each bit has been established. Integrators at the output of each channel are started under control of the clock at the beginning of each bit, and their voltages compared at or near the end of the bit time. Since the channels are of equal bandwidth, noise makes the same contribution to each, and an extremely small signal level will suffice to indicate which of the three frequencies is being received.

It is therefore the principal object of this invention to provide, in a digital communication system of the type described, new and improved methods and means for receiving digital information signals notwithstanding a very poor ratio of signal to noise.

Another object is to provide improvements in receiver methods and means of this type in which much of the received information and intelligence is transmitted by prearrangement.

Still another object in the provision of receivers of information transmittals by prearrangement is to provide for receiving coherently related frequency shift keying signals and reconstructing the keying frequency therefrom whereby the time of reception of the signal frequencies will be known notwithstanding drifts in the transmitted frequencies.

It is a further object to provide a correlation type of receiver system with an extremely narrow effective bandwidth.

It is a further object to provide a narrow band receiver which is able automatically to follow drift in the intelligence frequencies which is much larger than the effective bandwidth.

Yet another object is to provide a receiver system in which the combined effects of information transmittals by prearrangement, narrow bandwidth, coherence between frequencies, and noise reduction are utilized to increase the receiver sensitivity.

Still a further object is to provide a correlation method and receiver of known frequency shift keying signals in which the receiver functions only as a decision making device to determine which of said signals is being received at any time.

Still another object resides in the provision of a decision making correlation receiver of frequency shift keying signals in which the coherence between the signal and keying frequencies and the comparative strengths of the received signals are utilized to determine which of the signals is being received at any time.

Yet another object is to provide a decision making correlation receiver in which local oscillations are established at the receiver and locked in phase and frequency with received frequency shift keying signals of known signal and keying frequencies whereby the keying frequency may be accurately reconstructed from said oscillations.

Other objects and features of the present invention will be readily apparent to those skilled in the art from the following specification and appended drawings wherein are illustrated preferred forms of the receiver and certain of its components, and in which.

Figure 1:
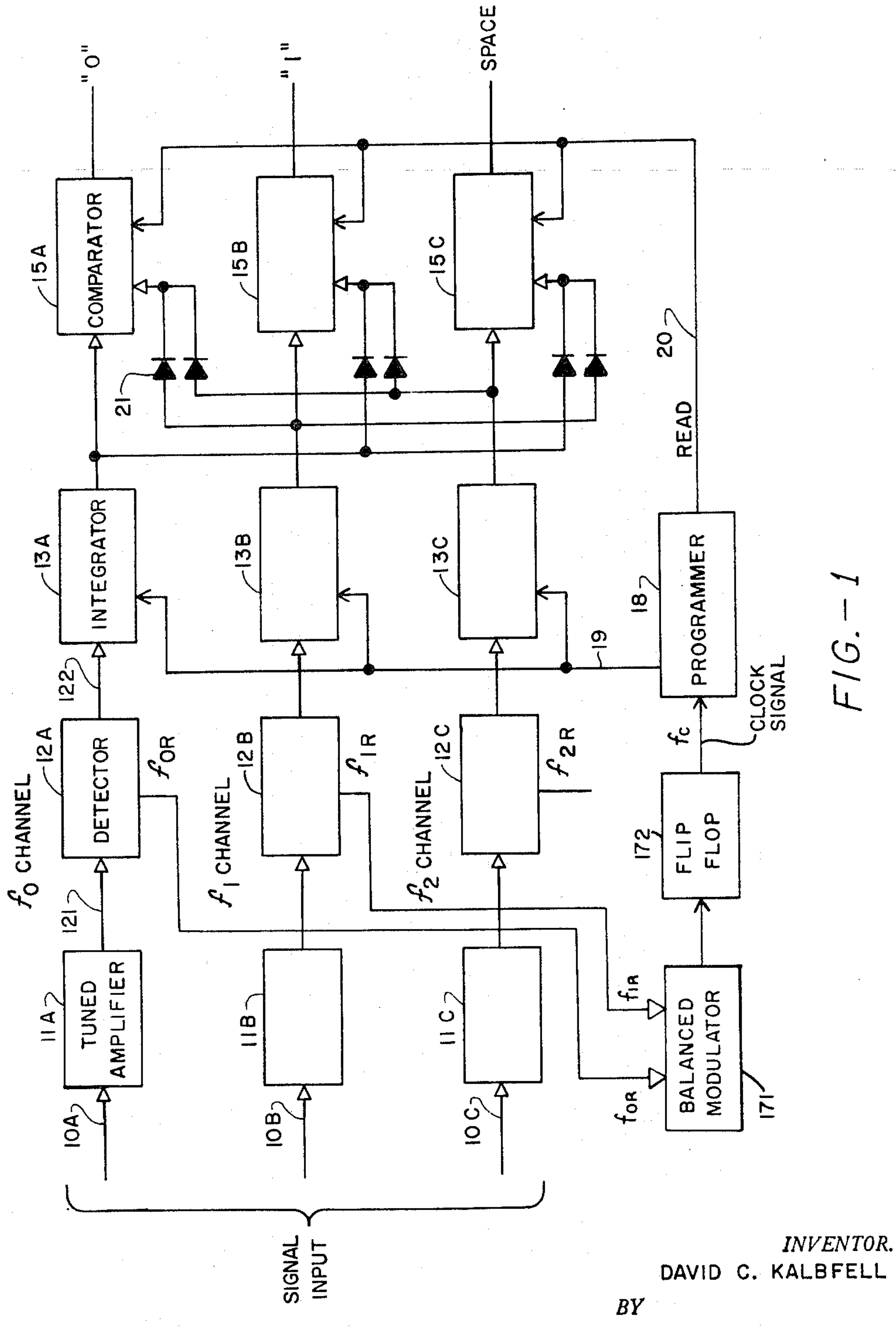
FIGURE 1 is a simplified block diagram of a receiver designed to receive digital information from a frequency shift keying or deviation type transmitter, and to determine which of three frequencies is present at any moment.

Referring now to FIG. 1 which is a simplified block diagram of a portion of the receiver system, the input signals for the $f_0$, $f_1$, and $f_2$ channels at 10A, 10B, and 10C may be derived, for example, from a nonresonant geophone disposed at or near the above-surface end of the drill pipe string in the case of the drill pipe system used in collecting data for logging oil wells. A more sophisticated approach in the latter case would be to use three geophones, individual to the three frequency channels and each resonant at one of the three frequencies which is liable to be transmitted. Resonant geophones are more sensitive than nonresonant ones, and also give better rejection of ambient noise. The source of the signals being applied to the tuned amplifiers 11A, 11B, and 11C, however, is immaterial to the functioning of the remainder of the receiver system which is the important part of this invention.

Each block in FIG. 1 is designed to reinforce or amplify the desired intelligence while suppressing noise or undesired signal components. For purposes of illustration, assume that $f_0$, $f_1$, and $f_2$ are 98, 102, and 100 cycles per second, and that one of these three frequencies is being received at any moment. It is the job of the receiving system to ascertain which one. In my copending transmission system application aforesaid, wherein frequencies $f_0$, $f_1$ and $f_2$ are 49, 51, and 50 cycles per second and are generated in such a manner that there is a coherent relationship between them their repetition rate is 1 cycle per second. This will correspond, in the instant case of the assumed frequencies of 98, 102, and 100, to a repetition rate of 2 cycles per second.

The phase-locking detectors 12A, 12B, and 12C, are driven from the three reference frequencies $f_{0R}$, $f_{1R}$, and $f_{2R}$ which might be supplied from voltage controlled oscillators, as will be explained more fully below. The output of each detector will typically be a train of half sine waves which will have a direct current component when intelligence is being received. The well known balanced ring diode demodulator or its transistor equivalent is suitable for this purpose, as hereinafter described with reference to FIG. 2.

Integrators 13A, 13B, and 13C, accumulate the output signals from the three detectors for a period of time determined by the programmer 18 which, in turn, is under the control of a clock signal $f_c$. At the beginning of the receiving period for each bit of information, the programmer causes the integrating capacitors to be short circuited momentarily, thereby starting the three integrators from zero voltage simultaneously. Support that $f_0$ is being transmitted at a particular time. Then it is important that integrators 13B and 13C suppress any $f_0$ signal which appears on their channels, in addition to suppressing background noise. $f_0$ may be effectively suppressed in the $f_1$ and $f_2$ channels by a judicious choice of the integrating period. For example, if the three frequencies are 98, 100, and 102 cycles per second, then the integrating period should preferably be an integral multiple of 0.5 second to give exact cancellation of the unwanted signals. That this is so may be shown from the following explanation. Assume that 100 c.p.s. is the frequency being transmitted, and that the integrating period is 0.5 second. Then the 100 c.p.s. channel in the receiver will put out 100 half cycles during this period, all of one sign, and these will integrate up to the maximum possible voltage consistent with the signal strength. The 100 c.p.s. energy being transmitted will also be received to some degree by the 98 c.p.s. channel in the receiver. Of course, this channel is using a 98 c.p.s. reference oscillator so that the resulting output of that channel is a 2 c.p.s. sine wave, having both polarities during any given interval of 0.5 second. If the integrator for that channel averages the output of the 98 c.p.s. demodulator for exactly 0.5 second, the 100 c.p.s. component of incoming signal would average out to zero in the integrator. This relieves the preliminary filter of the requirement for complete channel separation, since each integrator will cancel signals coming in at the other two frequencies.

It was mentioned above that the voltage waveform between a detector and its integrator was a train of half sine waves which contained a direct current component when intelligence was present. There may also be a direct current component without intelligence, however, if the wrong integrating period is chosen, and this effect may be particularly serious if the integrating period is not long enough to contain a very large number of cycles. If an arbitrary integrating period had been chosen, then the 2 c.p.s. component coming from the 98 c.p.s. integrator would not completely cancel out, and there would be a residual direct current component. The practical importance of this factor depends upon the need for or effectiveness of the preliminary filtering. By choosing an integrating period equal to the reciprocal of the difference frequency between the unwanted incoming frequency and the reference frequency, however, this unwanted direct current component is exactly cancelled.

Comparators 15A, 15B, and 15C, are used to determine which of the three integrators has acquired the largest voltage at the time that the "READ" command is given by the programmer 18 on line 20. These comparators may be simple flip-flops whose supply power is provided from line 20 as a convenient means of operating on command. The comparison is made by applying signal from its parent integrator to one side of the flip-flop while signals from the two foreign integrators may be gated through diodes 21 to the other side of the flip-flop. For best sensitivity, more sophisticated comparators would probably be used, but the operation would be analagous to the simple case illustrated above.

Figure 2:
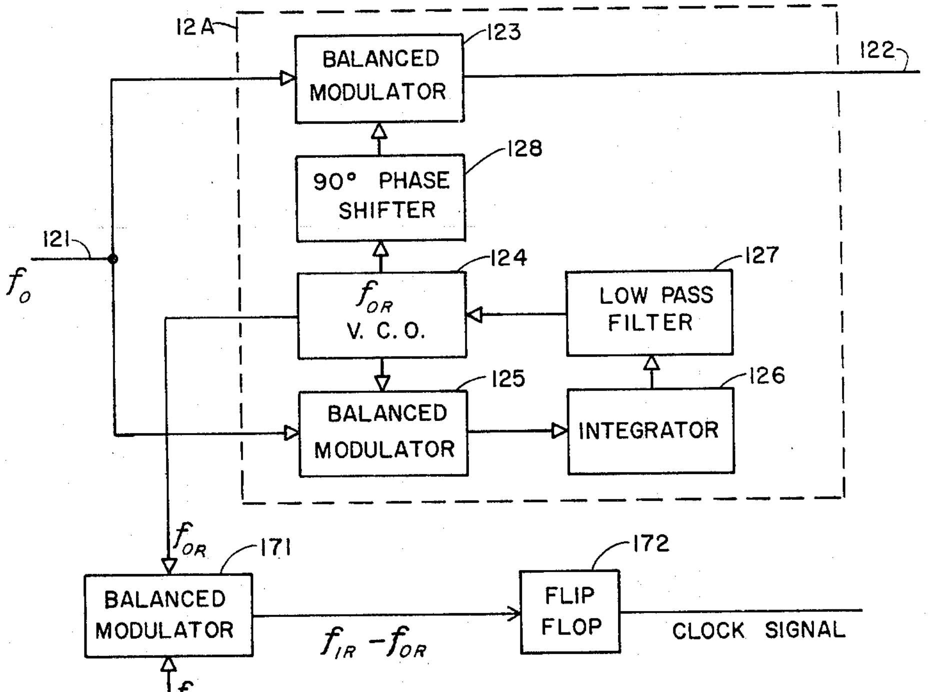
FIG. 2 shows details of the detector and clock synthesizer.

FIG. 2 shows a preferred form of detector 12A. The $f_0$ signal on line 121 is fed to balanced modulator 123 which performs the demodulating function of 12A and provides the aforementioned train of half sine waves as an output signal on line 122. Blocks 123, 125 and 171 are labelled "BALANCED MODULATOR." It is to be understood, however, that this expression is to be taken in a generic sense which includes such circuits as well known diode ring demodulators which have been used extensively, for example, in telephone carrier systems. Reference is directed to pages 366 and 306–308 of Active Networks by Vincent C. Rideout published by Prentice Hall in 1954. For a more complete discussion of the diode ring and other phase sensitive demodulators, reference is directed to pages 323–328 of Vacuum Tube Circuit Design by D. C. Kalbfell, copyright 1954.

The reference signal at frequency $f_{0R}$ is derived from a voltage controlled oscillator (V.C.O.) 124 which is controlled by a conventional phase locked loop consisting of another balanced modulator 125, integrator 126, and low pass filter 127 to bring the reference voltage into phase with the incoming signal. Voltage controlled oscillator 124 automatically adjusts itself to be 90° out of phase with the incoming signal $f_0$ in the following manner. Balanced modulator 125 receives its reference signal from V.C.O. 124 and its incoming signal $f_0$ by way of line 121. If these two signals differ by 90°, then the balanced modulator 125 has zero average output voltage, and integrator 126 remains at a constant output. It thus does not change the frequency of V.C.O. 124, and the system is at a stable equilibrium. Suppose now that $f_0$ is not exactly 90° away from $f_{0R}$. The balanced modulator 125 will then have a net D.C. output component which will be integrated. The output voltage of the integrator 126 will then rise or fall depending upon the polarity of the net output of modulator 125. This changing integrator voltage will then cause the V.C.O. 124 to increase or decrease its frequency slightly until it is once again at the same frequency as $f_0$, and exactly 90° different in phase.

The reference signal $f_{0R}$ is thus adjusted to be 90° out of phase with incoming signal $f_0$. Since balanced modulator 123 demodulates the incoming signal $f_0$, it requires a reference signal which is in phase with $f_0$. This is accomplished by passing signal $f_{0R}$ from V.C.O. 124 through a 90° phase shifter 128.

When frequency $f_1$ or $f_2$ is being received instead of $f_0$, then the phase locked loop must be inoperative so that $f_{0R}$ will remain at the value it had when $f_0$ was last being received. If the tuned amplifier 11A is narrow enough, the magnitude of the signal on line 121 will be very small under these conditions, and control will cease automatically. Control of V.C.O. 124 ceases when $f_0$ is not being received because then the balanced modulator 125 has zero output voltage, and the output of the integrator 126 remains constant, thereby holding the V.C.O. at its last controlled frequency. This situation will generally prevail when $f_1$ or $f_2$ is being transmitted, since the preliminary filtering would make the signal received on buss 121 too small to have an appreciable effect on the frequency of V.C.O. 124. Another method would be to detect the alternating component on line 122, and have this trigger a circuit for disabling the phase locked loop control.

When the three intelligence frequencies $f_0$, $f_1$, and $f_2$ are generated coherently from a basic clock frequency as described in the aforementioned copending application, then that clock frequency can be reconstituted in the correct phase by mixing any two of the three intelligence frequencies in the receiver. For this purpose, it is desirable to use the intelligence frequencies generated by two of the V.C.O.'s rather than the directly received signals since the V.C.O. signals are present continuously.

The balanced modulator 171 may be used to mix $f_{0R}$ (98 c.p.s.) and $f_{1R}$ (102 c.p.s.) to give a signal at 4 cycles per second (in this example). A flip-flop 172 serves to shape the wave and divide the frequency in half. This is then suitable for the programmer, where the 2 c.p.s. clock frequency is required for starting the integrator and supplying the "READ" command to the comparators in the assumed example of $f_0$, $f_1$ and $f_2$ being 98, 102 and 100 cycles per second, respectively. When the clock frequency is reconstituted from $f_{2R}$ (100 c.p.s.) and $f_{0R}$ (98 c.p.s.) or from $f_{1R}$ (102 c.p.s.) and $f_{2R}$ (100 c.p.s.), the difference frequency in each case is 2 c.p.s. and the flip-flop 172 is not required. It will be understood, in either case, that the difference frequency might be halved again if an integrating period of 1 second were desired.

Figure 3:
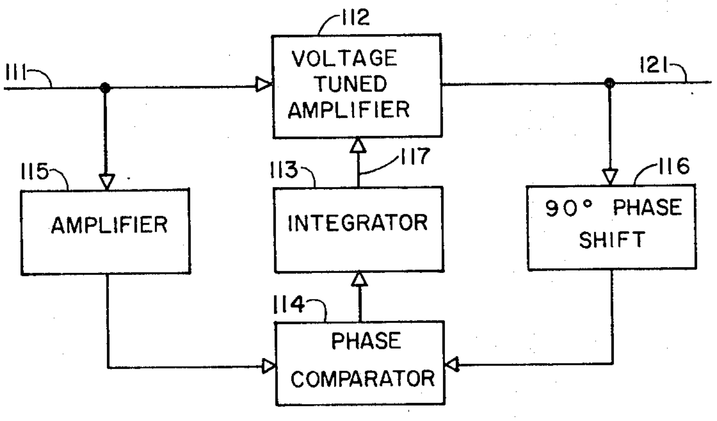
FIG. 3 shows a self tracking tuned amplifier for the input section.

It was mentioned above that the intelligence frequencies $f_0$, $f_1$, and $f_2$ might be subject to some drift although they would remain coherently locked together. The detection system shown in FIG. 2 could easily follow such drifting, but the simple tuned amplifier 11A shown in FIG. 1 might be inadequate, since it is desirable to make this amplifier of very narrow bandwidth. FIG. 3 shows a method for tuning the amplifier automatically to follow drifting. The basic amplifier 112 has its resonant frequency determined in part by the voltage applied on line 117. Amplifier 112 might contain a tuned circuit with a reactance modulator in parallel, analogous to the schemes used in F.M. broadcast transmitters. However, at the low frequencies used in drill pipe data collection systems, a resistance tuned positive feedback amplifier might better be employed. This might use an active Wien bridge or a twin-T circuit (containing a transistor) in the positive feedback loop. The variation of the dynamic collector resistance of this transistor would vary the frequency of maximum gain.

Regardless of the circuit details, however, the amplifier 112 would have zero phase shift at that frequency where its gain was a maximum. Comparing the input and output in phase comparator 114, gives a correction signal to the integrator 113 which will maintain amplifier 112 tuned for zero phase shift.

In summary, I have described a novel digital communication system employing coherently related frequencies which are selected by frequency shift keying at the transmitter, at a bit rate which is coherently related to the intelligence frequencies. To receive digital intelligence, it is necessary to recognize a series of "zeros and ones" or dots and dashes. This is made easy in my system by knowing when to look, and what to look for.

I have described a decision making receiver system in which conventional hardware modules are combined in a novel manner to give extremely good suppression and balancing of background noise and good suppression of foreign or spurious frequencies on each channel. This is accomplished by taking advantage of foreknowledge of the intelligence frequencies, and of their coherent character. Thus it is possible to develop the bit timing synchronization over a long period, so that the starting time for each bit is known. Knowing the starting time of each bit, it is possible to perform the integration over such an interval that optimum rejection of foreign frequencies is realized.

Using a separate detector (such as shown in FIG. 2), for each channel, it is possible to stabilize these detectors with long time constants, giving extremely narrow noise bandwidth, while still responding rapidly to a new bit of intelligence through discharging the integrating capacitors at the optimum moment by the use of the slaved coherent clock and programmer circuitry.

From the foregoing, it should now be apparent that various receiver methods and apparatus have been provided which are well adapted to fulfill the aforestated objects of the invention. It is to be understood, however, that the invention may be embodied in other forms or carried out in other ways without departing from the spirit or essential characteristics thereof. The methods and embodiments of the invention hereinbefore disclosed therefore are to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A decision making receiver of frequency shift keyed input signals having coherently related signal and keying frequencies comprising, in combination, a plurality of signal channels individual to said signal inputs, each said channel having a detector for producing a reference oscillatory signal whose frequency is servoed to the frequency of its input signal and utilizing its reference signal to demodulate its input signal thereby to provide a demodulated output signal, means for beating a predetermined pair of the channel reference signals to provide a beat signal therefrom whose frequency is the difference between those of said pair of reference signals, means for converting said beat signal to a clock signal whose frequency duplicates the original transmitter keying frequency, and means timed by the clock signal for comparing the demodulated signal outputs to determine which of the signal inputs is greatest during each clock interval.

2. A decision making receiver as in claim 1, each said detector comprising a phase locked loop including a balanced modulator for heterodyning the input and reference signals and a voltage controlled oscillator for providing the reference signal, a 90° phase shifter, and a modulator which is fed with the input signal and with said reference signal via the 90° phase shifter to provide said demodulated output signal in the form of half sine waves whose average value is proportional to the strength of the input signal.

3. A decision making receiver of frequency shift keyed input signals having coherently related signal and keying frequencies comprising, in combination, a plurailty of signal channels individual to said signal inputs, each said channel having a detector, an integrator and a comparator, each said detector having means responsive to its channel input signal for producing a reference oscillatory signal whose frequency is servoed to the frequency of said input signal, each said detector having means for demodulating its channel input signal with its channel reference signal to provide a demodulated output signal therefrom, each said integrator having means for integrating the demodulated output signal of its detector to provide an integrator output therefrom, each said comparator having means for comparing the integrator output of its channel with the integrator outputs of the other channels to produce an output voltage when its channel integrator output is larger than the integrator outputs of the other channels, means for beating a predetermined pair of the channel reference signals to provide a beat signal therefrom whose frequency is the difference between those of said pair of reference signals, means for converting said beat signal to a clock signal whose frequency duplicates the original transmitter keying frequency, and a programmer having means controlled by said clock signal for concurrently re-setting all of the channel integrators and for concurrently activating all of the channel comparators just prior to re-setting the integrators.

4. A decision making receiver as in claim 3, each said signal channel having a narrow band self tuning amplifier for amplifying its signal input, said self tuning amplifier comprising a voltage tuned amplifier having zero phase shift at that frequency where its gain is maximum and having voltage responsive means for varying the frequency of maximum gain, and means including a phase comparator interconnecting the input and output of said voltage tuned amplifier for varying the voltage to said voltage responsive means in accordance with the difference in phase between said amplifier input and output.

5. A decision making receiver as in claim 3, each said integrator having an integrating period equal to an integral multiple of the reciprocal of the difference between the frequencies of any pair of the signals.

6. A decision making receiver of frequency shift keyed signals of approximately known and coherently related signal and keying frequencies, comprising a plurality of local oscillators respectively operated nominally at the known frequencies of said signals, means for respectively locking said oscillators in fixed phase relationship with the received signals, means for reconstructing said keying frequency from said phase locked oscillator frequencies, means for detecting said signals, and means for integrating said detected signals and comparing the integrated signals repetitively at the rate of said reconstructed keying frequency.

References Cited by the Examiner

UNITED STATES PATENTS

| | | | |
|---|---|---|---|
| 2,882,338 | 4/1959 | Wozencraft | 325—320 |
| 2,993,958 | 6/1961 | Barnes | 178—66 |
| 2,999,925 | 9/1961 | Thomas | 178—66 |
| 3,028,487 | 3/1962 | Losee | 178—66 |
| 3,030,503 | 4/1962 | Kahn | 325—320 |

NEIL C. READ, *Primary Examiner.*

A. H. WARING, L. A. HOFFMAN, *Assistant Examiners.*